United States Patent [19]

Groeneweg

[11] 4,047,209
[45] Sept. 6, 1977

[54] FILM TRANSPORT

[75] Inventor: Abraham Groeneweg, Ridderkerk, Netherlands

[73] Assignee: N.V. Optische Industrie "De Oude Delft", Netherlands

[21] Appl. No.: 578,012

[22] Filed: May 16, 1975

[30] Foreign Application Priority Data

May 20, 1974 Netherlands .......................... 7406745

[51] Int. Cl.² .............................................. G03B 1/00
[52] U.S. Cl. .......................................... 354/212; 271/4
[58] Field of Search .................... 354/212; 271/4, 19, 271/245, 246, 273

[56] References Cited

U.S. PATENT DOCUMENTS

| | | | |
|---|---|---|---|
| 3,499,710 | 3/1970 | Sahley | 271/4 |
| 3,627,307 | 12/1971 | van der Does | 271/19 |

Primary Examiner—L. T. Hix
Assistant Examiner—Alan Mathews
Attorney, Agent, or Firm—Marn & Jangarathis

[57] ABSTRACT

Method and apparatus for transporting lengths of film in a camera, particularly for taking pictures from a fluorescent screen, such as an X-ray screen.

Using a single motor, the rate of transport is made independent of the rate of exposure, thereby allowing for maximum exposure times, permitting low radiation intensities.

1 Claim, 3 Drawing Figures

FILM TRANSPORT

This invention relates to a method of, and apparatus for, transporting pre-determined lengths of film to and from an exposure station, in particular for use in a camera for taking pictures from a fluorescent screen, such as an X-ray screen.

In prior apparatus of this kind, described in Dutch Patent Specification No. 88,695, lengths of film are fed by means of transporting rollers to a gap between an image window and a hold-down frame, there being provided a single motor for driving, through mechanical transmissions, said transporting rollers, means for separating lengths of film, in that case a pair of co-operating knife-blades, one of which is movable to and from the other, stationary blade, the hold-down frame, into and out of its operative position, and a stop which is moved into and out of the path of movement of the lengths of film. In this prior arrangement, the rate at which the lengths of film are fed through the apparatus is adjustable only by adjusting the speed of the motor. Thus, for example, if the number of lengths of film to be transported per second is reduced, such as from 12 to six, the motor speed is decreased. This, it is true, increases the residence time of a length of film in the exposure station, but also lengthens the time needed for feeding it to the latter. In other words, in the prior arrangement, the ratio between the residence time of a piece of film in the exposure station, i.e. the time available for making an exposure, and the time required for transport is constant and is fully determined by the ratio that can practically be achieved in transporting the largest number of lengths of film per second. As such film transporting devices are mainly used in cameras for taking pictures from X-ray screens, this is a drawback, the aim being maximum exposure times, in order that low intensities of radiation may be used.

It is an object of the present invention to provide a method of, and apparatus for, transporting pre-determined lengths of film to and from an exposure station, in which the residence time of a length of film in the exposure station is maximal at any number of lengths of film to be transported per unit of time.

According to one aspect of the present invention, there is provided a method of feeding pre-determined lengths of film from a supply station to an exposure station and, after exposure therein, discharging them to a collecting receptacle by means all driven from one motor, characterized in that when the number of lengths of film to be transported per unit of time is varied the time of transport of a length of film to and from said exposure station, as well as the total time for transporting such length of film from said supply station to said collecting receptacle, are kept constant.

According to another aspect of the present invention, there is provided apparatus for supplying and discharging pre-determined lengths of film to and from a position between an exposure window and a hold-down frame movable towards, and away from, said exposure window, there being a gap between said exposure window and said hold-down frame with a supply end and a discharge end, at each of which ends there are disposed a pair of shafts in transverse parallel relationsip to, and on opposite sides of, the plane of a path of travel of said lengths of film, said shafts carrying transporting rollers adjacent their ends with opposing rollers movable into, and out of, cooperative association, means for separating a length of film from a stack in a supply cassette and transporting the separated length of film from said supply cassette to within reach of the transporting rollers on said supply end.

One embodiment of the present invention will now be described, by way of example, with reference to the accompanying drawings, in which FIG. 1 is a part-sectional sideview of an apparatus according to the present invention;

Figure 1:
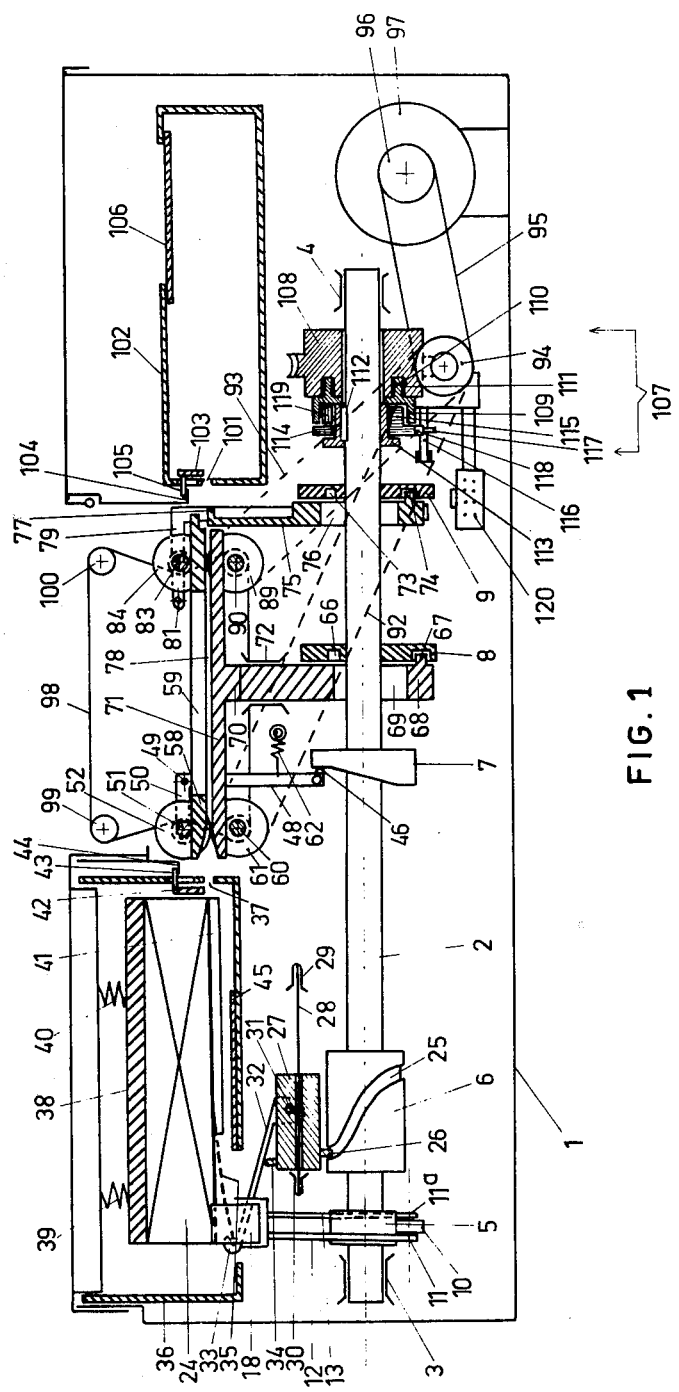

Referring to the drawings, there is shown in FIG. 1 a film transporting apparatus comprising a housing 1 in which, as shown diagrammatically, a mainshaft 2 is mounted for rotation about its longitudinal axis in bearing 3 and 4. Rigidly mounted on mainshaft 2 are cam disks 5, 6, 7, 8 and 9.

Figure 2:
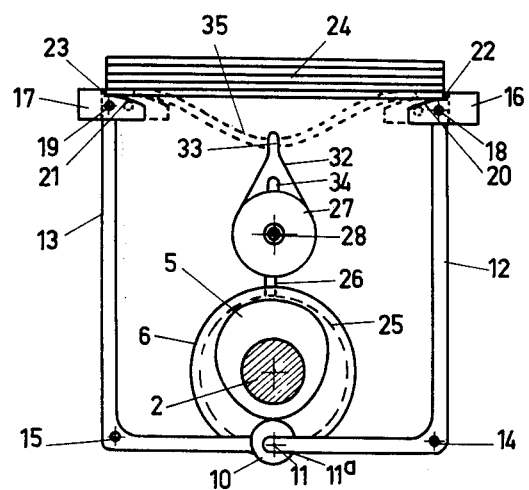
FIG. 2 shows the apparatus of FIG. 1, viewed in the direction of arrow A.

As shown in FIG. 2, cam disk 5 co-operates with a little roller 10 mounted for rotation, at 11 and 11a, respectively, on the ends of a pair of bell-crank levers 12 and 13, respectively, which are pivoted to housing 1 at 14 and 15, respectively. At the other ends of bell-crank levers 12 and 13, pushers 16 and 17, respectively, are mounted on shafts 18 and 19, respectively. Pushers 16 and 17 are respectively formed with inclined surfaces 20 and 21 which terminate in upright surfaces 22 and 23. The inclined surfaces 20 and 21 are designed to rest against the lower surface of the lowermost length of film in a stack 24 accomodated in a detachably secured cassette 36. The upright surfaces 22 and 23 of pusher 16, 17, respectively, have a length slightly less than the thickness of a length of film. Rotation of the mainshaft 2 and hence of cam disk 5 results in pushers 16 and 17 performing a reciprocating movement relative to stack 24 between the position shown in fully drawn lines and that shown in dotted lines in FIG. 2. This movement of pushers 16 and 17 causes the lowermost sheet of film from the stack to be bulged downwardly so that it is centrally cleared from the rest of the stack, as shown dotted in FIG. 2.

Cam disk 6, which is mounted on mainshaft 2, is formed with a groove 25 co-operating with a dog 26 secured to a cylindrical block 27. Block 27 is capable of performing a reciprocating movement on a shaft 28 secured to housing 1 at 29 and 30. Mounted on block 27, at 31, is an arm 32 having a hook-shaped end 33. Arm 32 rests on a stop 34 secured to block 27.

Rotation of cam disk 6 causes block 27 to perform a reciprocating movement on shaft 28, in consequence of which hook 33 will perform a reciprocating movement as well. In so doing, hook 33 catches behind an edge of the lowermost sheet 35 of stack 24, bulged by pushers 16 and 17.

As shown in FIG. 1, pushers 16 and 17 and hook 33 extend through an opening into cassette 36. The movement of hook 33 from the position shown in FIG. 1 to the right results in the lowermost sheet 35 being pushed from cassette 36 through opening 37.

Cassette 36 comprises a hold-down plate 38, which is pushed down against a stack 24 by springs 39 and 40, the lowermost sheet 35 being pushed against strips 41 extending over part of the length of the stack on opposite sides thereof. The opening 37 in cassette 36 can be closed with a slide 42. Slide 42 is fitted with a dog 43 which when cassette 36 is placed in housing 1 comes into contact with a dog 44 secured to housing 1. The opening in the bottom of cassette 36, through which pushers 16 and 17 and arm 32 with hook 33 extend into the cassette, can be closed with a slide 45.

Cam disk 7, secured to the mainshaft, co-operates with a dog 46 secured to the back 47 (see FIG. 3) of a U-shaped frame. Legs 48 of said frame are mounted for rotation on horizontal shafts 49 mounted on housing 1. At the point where they are connected to shafts 49, these legs have a perpendicular extension 50, between the ends of which a shaft 51 is mounted for rotation. Shaft 51 mounts transporting rollers 52 and 53 and, on one end projecting through one of extensions 50 (see FIG. 3) a roller 55. Transporting rollers 52 and 53 are located over apertures 56 and 57 in frame 58 of exposure window 59, through which they are in contact with transporting rollers 61 mounted on a shaft 60. Shaft 60 is mounted for rotation in housing 1 and carries a roller 54, the function of which will be described hereinafter.

When cam disk 7 is rotated, the legs 48 of the U-shaped frame will be moved to the left against the action of springs 62 and 63 (see FIG. 3) attached to them at one end and secured to housing 1 at the other (at 64 and 65, respectively). The movement of legs 48 causes transporting rollers 52 and 53 to be moved towards and away from rollers 61.

Cam disk 8 mounted on mainshaft 2 has a groove 66 cooperating with a dog 67 secured to a leg 68 having an aperture 69 through which extends mainshaft 2. Above aperture 69 leg 68 passes into a U-shaped member whose legs have their ends attached to a hold-down frame 71. Leg 68 is guided by means schematically shown at 72 for effecting an up-and-down movement.

It will be clear that rotation of cam disk 8 results in hold-down frame 71 being moved towards and away from exposure-window frame 58.

Cam disk 9, mounted on mainshaft 2 has a groove 73 cooperating with a dog 74 secured to a plate member 75. Plate member 75 has an aperture 76 through which extends mainshaft 2. The upper edge 77 of member 75 forms a stop for retaining lengths of film present in the gap 78 between the exposure-window frame and the hold-down frame.

Rotation of cam disk 9 results in that, guided by means not shown, member 75 performs an up-and-down movement, stop 77 being moved between a position in which it closes gap 78 between exposure-window frame 58 and hold-down frame 71, and one in which it clears gap 78.

Member 75 furthermore co-operates with two arms 79 and 80, mounted for rotation in housing 1 at 81 and 82, respectively. Mounted for rotation between arms 79 and 80 is a shaft 83 carrying two transporting rollers 84 and 85. The end of shaft 83 extends through arm 80 and carries a roller 86, the function of which will be described hereinafter. The transporting rollers can come into contact with transporting rollers 89 through holes 87 and 88 in exposure-window frame 58. During the up-and-down movement of member 75, arms 79 and 80 are taken along so that rollers 84 and 85 are moved towards and away from rollers 89.

Rollers 89 are mounted on a shaft 90, mounted for rotation in housing 1. Shaft 90 further carries a roller 91.

Transporting rollers 61 and 89 are driven owing to rollers 54 and 91 being coupled via belts 92 and 93, respectively, to a worm 94, which in turn is coupled with a belt 95 to the shaft 96 of a motor 97.

Figure 3:
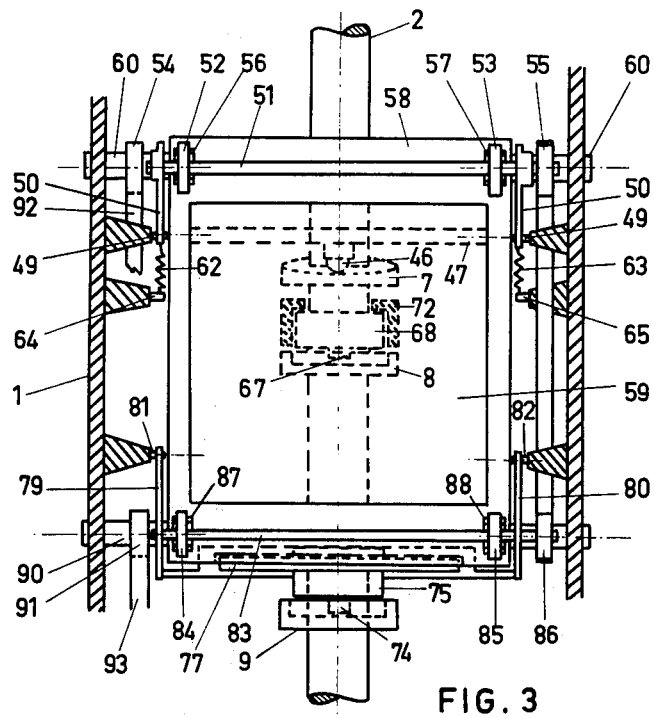
FIG. 3 shows a part of the apparatus of FIG. 1 in plan view.

Under rollers 55 and 86, as viewed in FIG. 3, are rollers mounted on shafts 60 and 90, respectively.

Trained about these latter rollers is belt 98 shown in FIG. 1, which is also passed over rollers 99 and 100, mounted for rotation in housing 1. It will be clear that in any position of rollers 52, 53 and 84, 85, belt 98 will transmit the motion of rollers 61 and 89 to said rollers, and this in such a manner that the co-operating transporting rollers rotate in reciprocally opposite directions.

The operation of the apparatus described hereinbefore is as follows.

A length of film 35, bulged by pushers 16 and 17 is engaged by hook 33 and, as viewed in FIG. 1, pushed from supply cassette 36 through aperture 37. The length of film then comes between transporting rollers 52, 61 and 53, 61, and is shot by these rollers against stop 77. At that moment rollers 84, 89 and 85, 89 are out of contact with each other, and stop 77 closes gap 78 between the hold-down frame and the exposure-window frame. Subsequently hold-down frame 71 is moved upwards and presses the length of film against exposure-window frame 58. During the time when frame 71 remains pressed against frame 58, the length of film can be exposed.

Subsequently frame 71 is moved downwards, rollers 84 and 85 are moved into contact with the length of film, and rollers 52 and 53 move upwards. At the same time, stop 77 is moved to a position out of the path of movement of the length of film. The length of film is now driven out of gap 78 by rollers 84, 89 and 85, 89 and is moved through an opening 101 into a collecting cassette 102 mounted in housing 1. Opening 101 can be closed with a slide 103, which in the position shown in FIG. 1 has been lifted by a dog 104 secured to the housing 1, which engages with a projection 105 on slide 103. The wall of cassette 102 is further diagrammatically shown to be provided with a sliding door 106, which can be slid aside for the removal of lengths of film from the cassette.

As shown in FIG. 1, the mainshift 2 is not driven direct by shaft 96 of motor 97, but through a single-stroke clutch generally indicated at 107. The clutch includes a pinion 108, loosely mounted on mainshaft 2 in engagement with worm 94, which as stated before, is coupled through belt 95 to shaft 96 of motor 97. A cup member 109 is connected to pinion 108 through projecting pins 110, which fall into holes 111 in pinion 108. Rubber sleeves may be inserted between pins 110 and the walls of holes 111. The cup portion of member 109 has a circular inner periphery. Keyed to mainshaft 2, by means of key 112, is a sleeve 113 having a hexagonal periphery along part of its length. The hexagonal part of sleeve 113 is accommodated within the cup portion of member 109. Furthermore a ring 114 with a round opening is mounted on sleeve 113. This ring, loosely confined between a flange portion of sleeve 113 and the edge of cup member 109, has six projections 115, uniformly spaced along the circumference of a circle, and each fitting between a lateral surface of the hexagonal part of sleeve 113 and the circular inner surface of member 109, so that they are clear of sleeve 113 and of member 109. Ring 114 is restrained from rotary movement by a pawl 117, mounted for rotation about a pin 116, and resting against a lug 118 attached to the circumference of ring 114. Furthermore, six rollers 119 are provided between the inner wall of member 109 and sleeve 113, which rollers just fit between the centre of one of the six lateral surfaces of sleeve 113 and the inner wall of member 109.

In this position of rollers 119, they each rest against projection 115. Member 109 is then capable of rotary movement while sleeve 113 and hence mainshaft 2 stand still. When pawl 117 (see FIG. 1) of lug 118 is released, the rollers will become wedged between the inner wall of member 109 and sleeve 113, resulting in sleeve 113 and hence mainshaft 2 being taken along by pinion 108. If now, shortly before the completion of one revolution of the mainshaft, pawl 117 is re-set to its previous position, the rotary movement of ring 103 is stopped and projections 115 push rollers 119 from their jammed position between sleeve 113 and member 109, as a result of which the rotation of sleeve 113 and hence of the mainshaft is stopped.

The retraction of pawl 117 can be effected electromagnetically and by known per se means shown diagrammatically at 120.

It will be clear that the use of a single-stroke clutch has for its result in this case that, irrespective of the number of lengths of film to be transported per second, the actual time of transport is constant, and that when the number of lengths of film to be transported per second is reduced it is only the residence time of the film in the exposure station which is increased. This only requires selecting such shapes for the various cam disks that during one revolution of the mainshaft a length of film is discharged from gap 78 and at the same time a next length of film is introduced into gap 78, while at the end of the revolution of the mainshaft holddown frame 71, transporting rollers 52 and 53 and stop 77 are in their uppermost position as viewed in FIG. 1.

It will be clear that the single-stroke clutch described hereinbefore can be replaced by any other clutch suitable for the purpose, and that, for the rest, many variations and modifications are possible without departure from the scope of the present invention.

I claim:

1. In a camera, apparatus for supplying and discharging predetermined lengths of film to and from a position between an exposure window and a hold-down frame movable towards, and away from, said exposure window, there being a gap between said exposure window and said hold-down frame, said hold-down frame having a supply end and a discharge end, at each of which ends there are disposed a pair of shafts in tranverse parallel relationship to, and on opposite sides of, the plane of a path of travel of said lengths of film, said shafts carrying transporting rollers adjacent their ends with opposing rollers movable into, and out of, cooperative association, means for separating a length of film from a stack in a supply cassette and transporting the separated length of film from said supply cassette to within reach of the transporting rollers on said supply end, a stop on the discharge end of said gap, downstream of the transporting rollers, said stop being movable to a position in the path of travel of the lengths of film for retaining a length of film, and to a position outside said path of travel for allowing the discharge of a length of film from said gap to a collecting cassette disposed on the discharge end of said gap, a motor operatively associated with a mainshaft, cam disks on said mainshaft for respectively moving said hold-down frame, said means for separating and transporting a length of film, said stop, and said transporting rollers relatively to each other, the rotary movements of said transporting rollers and of said mainshaft being derived from a power take-off shaft of said motor, and characterized in that, in operation, said motor runs at a constant speed, and in that said mainshaft is coupled to said power take-off shaft of the motor by a single-stroke clutch operable by electromagnetic means.

* * * * *